May 20, 1958 G. B. RICHARDS 2,835,204
ROTARY LIQUID DISPLACEMENT DEVICE
Filed Nov. 12, 1953 3 Sheets-Sheet 1

Inventor
George B. Richards

May 20, 1958 G. B. RICHARDS 2,835,204
ROTARY LIQUID DISPLACEMENT DEVICE
Filed Nov. 12, 1953 3 Sheets-Sheet 3

INVENTOR.
George B. Richards
BY
Fidler, Covey & Beardsley
Attys.

United States Patent Office 2,835,204
Patented May 20, 1958

2,835,204

ROTARY LIQUID DISPLACEMENT DEVICE

George B. Richards, Deerfield, Ill., assignor, by mesne assignments, to Liquid Controls Corporation, North Chicago, Ill., a corporation of Illinois Application November 12, 1953, Serial No. 391,488

17 Claims. (Cl. 103—125)

This invention relates to a rotary liquid displacement device and has to do more particularly with such a device which is especially well adapted for use as a liquid displacement meter, or which may be used as a pump, hydraulic pump, hydraulic motor, compressor, or blower.

Liquid displacement meters are used in numerous fields for accurately measuring the flow of liquids. Such meters are used widely in connection with the production, transportation, refining and marketing of petroleum products. They also are employed in connection with other liquid products and particularly those which are produced, stored, transported and dispensed in relatively large quantities rendering necessary the handling of such products in bulk form. It is desirable and in fact usually necessary that such meters have a high degree of accuracy over a long period of use.

Rotary liquid displacement meters have been provided which are satisfactorily accurate, but the construction of such meters has been relatively expensive, owing to the design of these meters. Attempts to reduce the cost of manufacturing such meters has resulted in the loss of accuracy, excessive servicing requirements and other disadvantages.

Devices of the above mentioned type used as blowers, pumps, hydraulic pumps, hydraulic motors and displacement meters all depend upon mechanical seals or capillary seals. It is established that in each existing design two or more pulsations per cycle exist in each device extending from 60 degrees to 250 degrees in angular rotation of the blocking rotor. Each time a rotary blade or "piston" leaves a cavity a partial vacuum is produced in that cavity and likewise each time a blade or piston enters a cavity compression of the liquid in some degree occurs.

In the case of blowers, pumps, hydraulic pumps, hydraulic motors or displacement meters, this increases the internal energy loss resulting in an increased differential pressure over the device. It has a consequent direct adverse effect upon the volumetric efficiency of the device, increases power input, produces pressure and flow pulsation as well as increase in wear in bearings, earlier destruction of mechanical seals and the breaking down of any liquid capillary seal.

The principal object of the present invention is to provide a rotary liquid displacement device having effective provision for the reduction of internal vacuum and compression while maintaining a fully effective seal between the inlet and outlet ports.

An object of the present invention is to provide an improved rotary positive displacement device for liquids which is simple in construction, easy and inexpensive to manufacture, effective in operation, and rugged and long wearing.

Another object is to provide an improved rotary positive displacement meter for liquids which is simple in construction and inexpensive to manufacture but at the same time highly accurate and capable of maintaining such high accuracy over a long period of use.

Another object is to provide a rotary displacement meter for liquids wherein the inertia of the movable members is relatively low, there is no friction between the relatively movable displacement members, and there is a minimum of interference with the smooth, streamline flow of liquid through the meter with the result that the resistance to flow of liquid through the meter is a minimum.

Another object is to provide a rotary positive displacement meter for liquids having a minimum number of moving parts of very light but strong construction whereby the inertia of the moving parts is a minimum.

A further object is to provide a rotary positive displacement meter for liquids having a minimum of interior pockets, crevices, partitions or other obstructions of such nature as might tend to collect debris and wherein the movement of the displacement members relative to the flow of liquid is such as to automatically remove debris from the interior of the meter.

Another object is to provide a rotary positive displacement meter for liquids of such construction that access to the interior may be readily gained and the interior of the meter quickly and easily cleaned, where such cleaning is necessary.

A further object is to provide a rotary positive displacement meter for liquids of the type employing displacement rotors and wherein the rotors are readily accessible and the clearance between the rotors and the stationary portion of the casing may be readily adjusted so that the meter may be adjusted for use with liquids of different viscosities.

Still another object is to provide a rotary positive displacement meter for liquids wherein there is no metal to metal contact and hence no rubbing friction between the relatively movable liquid displacement members whereby the meter retains its efficiency and accuracy over a long period of use and requires a minimum of servicing.

Other objects are to provide a rotary liquid displacement device wherein: vacuum and compression are reduced or eliminated by a single auxiliary porting arrangement; the construction of the device is such as to permit the employment of the aforesaid auxiliary porting; the volumetric efficiency is increased by an improved labyrinthine seal; hydraulically balanced light weight, low inertia, rotary members are employed; the arrangement is such that maximum displacement is obtained in the device employing either ball bearings or sleeve bearings for journaling the rotor shafts; the blades are adjustable without the use of shims; and the displacement cylinders each extend angularly through not more than 180 degrees.

Other objects and advantages of the invention will appear from the following description taken in connection with the appended drawings wherein.

The meter of the present invention includes a casing formed by a tubular member or body 10, the ends of which are closed by end plates 11 and 12 respectively which are suitably secured to the body 10 as by bolts 13. The casing defines a hollow space 14 having a cross-sectional shape including two generally semi-cylindrical end portions and generally cylindrical central portion. Inlet and outlet openings, or main ports, 15 and 16 are provided in a side wall of the casing and communicate with the chamber 14.

The end plates 11 and 12 have complemental auxiliary ports or passageways 101 and 102 extending over the specific sectors indicated as hereinafter explained more in detail.

Disposed in the chamber 14 and more particularly in the central, generally cylindrical portion is a blocking rotor 17 of generally cylindrical form but having an arcuate concave peripheral portion providing a cavity or recess 18 for purposes hereinafter explained. The blocking rotor 17 includes a shaft 19 which extends through aligned openings 20 in the end plates 11 and 12 and is journaled in bearings 21 which preferably take the form of ball bearings but which may be sleeve-type bearings. The bearings 21 are seated in bearing sockets 22 formed externally in the end plates 11 and 12. It will be noted that the bearings 21, 21 are located externally of the chamber 14 and consequently are not subjected to the liquid which passes through the meter. The construction of the bearing sockets 22, moreover, forms an effective seal and precludes the possibility of a circulation of liquid through the bearings 21, destroying the volumetric efficiency of the device.

The blocking rotor 17 also includes a body carried by the shaft 19 and of generally cylindrical form except for a concave recess 18 and the periphery thereof provided for the purpose hereinafter explained.

The blocking rotor 17 is disposed in the chamber 14 in position to define with the walls of the chamber a substantially semi-cylindrical inlet chamber 23, a substantially semi-cylindrical outlet chamber 24 and a generally arcuate connecting passage 25. The inlet and outlet ports 15 and 16 communicate with the inlet and outlet chambers 23 and 24 respectively. The blocking rotor is disposed in very close proximity to, but is slightly spaced from, an arcuate wall portion 26 (also herein designated as a "connecting wall portion" or as a "blocking wall portion") provided by a dividing block 26a between the inlet and outlet ports 15 and 16. The spacing between the periphery of the blocking rotor 17 and the wall 26 is so slight that a liquid seal is provided therebetween. The blocking rotor thus prevents the by-passing of liquid between itself and the wall 26. For the purpose of enhancing the sealing effect, the periphery of the blocking rotor 17 is provided with very minute serrations (not shown) extending parallel to the axis of the rotor 17 which form a labyrinthine or capillary seal. That is to say, when the rotor is rotated, the serrations cause turbulence in the liquid between the periphery of the rotor 17 and wall 26 which prevents any substantial flow of liquid between such positioned surfaces.

The rotor 17 may be constructed in various ways, but preferably it is hollow in order to reduce the weight and, consequently, inertia thereof. I have found that a very satisfactory rotor may be constructed by forming the body of a section of tubing 27 and two other semi-cylindrical sections of smaller tubing 28 and 29, secured to the shaft 19 and to the member 27, as by welding, which members 28 and 29 are of a smaller radius than the member 27. One of the members 28 is disposed in the opening of the member 27 so as to define the concave peripheral portion 18 and the other member 29 is disposed within the member 27 to serve as a stiffening member and also for the purpose of supporting the member 27.

The blocking rotor preferably is formed by attaching the two semi-cylindrical sections 28 and 29 to the shaft 19 as by tack welding (not shown) and then milling the assembly to an external diameter approximately equal to the internal diameter of the section 27. The assembly is then inserted in the tube which is to form the section 27. After tack welding the assembly in the tube at suitable points, not shown, cuts are made, as by slit milling, adjacent the outer edges of the section 28 to remove the intervening portion of the tube. If desired, instead of machining the sections 28 and 29 to the approximate internal diameter of the tube, they may be slightly larger and the tube approximately seated to receive the outer edges of the sections 28 and 29.

The mode of forming the rotor just described permits the use of a stainless steel tubing in forming the rotor, which I have found to be of great advantage in constructing meters for use with certain corrosive products. This material is particularly suitable because of its rigidity and inertness to corrosive products. Also it is unnecessary to perform any casting or extensive machining operation in the construction of the rotor; neither is any hardening operation required. It might be explained at this point also that the blocking rotor shaft 19, as well as other shafts to be referred to hereinafter, may be conveniently formed of stainless steel.

The blocking rotor 17 is open at both ends and consequently is filled with liquid at all times. Thus there is no pressure differential between the interior and exterior of the blocking rotor and the pressure of the liquid is uniform through the interior of the meter.

Disposed in the inlet chamber 23 is a displacement rotor 30 which includes a hub 31 and a blade 32. The hub is journaled in bearings 33, 33, similar to the bearings 22, 22 above described, and mounted in the end plates 11 and 12 in a similar manner. The hub 31 is formed with a diametrically extending slot 34 in which the blade 32 is closely fitted and suitably secured as by bolts 35. The slot 34 may, if desired, be extended into the interior of the inner bearing race. The bolts 35 extend through slots 36 in the blade 32 whereby the latter may be adjusted readily with respect to the hub 31. The displacement rotor 30 is centered with respect to the wall of the inlet chamber 23 so that the outer edge of the blade 32 sweeps along the cylindrical wall of the inlet chamber 23 in close proximity thereto, but spaced slightly therefrom. The outer free edge 37 and the end edges 38, 38 of the blade 32 are provided with longitudinally extending serrations which form labyrinthine seals with the opposing walls respectively of the inlet chamber 23.

A second displacement rotor 40 is disposed in the outlet chamber 24 and is constructed and arranged in a manner generally similar to the displacement rotor 30. The former includes a hub 41 and blade 42 preferably identical with the corresponding portions of the rotor 30.

The diameter of the hub 31 of the displacement rotor 30 and the hub 41 of the displacement rotor 40 is such that each of the hubs 31 and 41 is very close to but slightly spaced from the periphery of the cylindrical portion of the blocking rotor 17 so as to provide a liquid seal therebetween. Thus the blocking rotor serves at all times as a seal against one or the other of the hubs, as will appear more fully hereinafter. The hubs 31 and 41 preferably are provided with longitudinally extending serrations (not shown) which provide labyrinthine seals similar to the seals hereinbefore described.

The serrations (not shown) formed in the various members hereinbefore described may be made in various sizes depending upon the viscosity of the material to be metered, but they should be sufficiently small to provide the appropriate degree of turbulence and at the same time to prevent loss of efficiency of the meter. I have found that where the meter is to be used for metering light petroleum products, excellent results have been obtained by making the serrations approximately $\frac{1}{16}$ inch deep and approximately $\frac{1}{32}$ inch in width.

The meter may be made in a wide range of sizes to suit different uses. Where it is to be used for metering light petroleum products excellent results have been obtained by making the displacement rotors 30 and 40 each with a radius of $1\frac{3}{8}$ inches measured from the center of the hub to the outer, free edge of the blade. The blocking rotor 17 in this meter was $3\frac{1}{4}$ inches in diameter and the length of the interior space 14 and, consequently, the length of the several chambers was 4 inches. The meter displaced 22 cubic inches per revolution and thus, when rotated at a desirable speed, namely around 750 R. P. M., developed a capacity of 70 gallons per minute. The meter may be made in such sizes as to develop a capacity of from around 1 to around 15,000 gallons per minute or more.

The meter of the present invention is not limited to use with products of low viscosity but may be used to measure the flow of products of relatively high viscosity, such as No. 5 and No. 6 burning oils, bunker C and asphaltum.

In order to provide an effective labyrinthine seal for metering liquids having a viscosity of around 40 Saybolt seconds, Universal, the clearance between the relatively movable displacement members is adjusted to 0.003 inch.

The recess 18 in the periphery of the blocking rotor 17 is made sufficiently wide and deep to permit each of the displacement rotors 30 and 40 to sweep therethrough when the several rotors are rotated in the manner intended and preferably a considerable space is provided between the concave surface of the blocking rotor 17 and the outer, free edges of the blades 32 and 42 of the rotors 30 and 40. The recess 18 while preferably made arcuate in form may take any form so long as it provides sufficient clearance for the blades.

The blocking rotor 17 and the displacement rotors 30 and 40 are connected together in driving relationship so that they rotate at the same angular velocity and are maintained in predetermined angular or phase relationship. To this end gears 45, 46 and 47 are secured on the hubs 31 and 41 and the shaft 19 respectively on the portions of such members which project beyond the end plate 12. Each of the aforementioned gears is secured on its shaft and locked against relative angular movement thereon by a nut 48 and a nut retainer 49, a stud portion 50 of which is inserted in a socket in the gear and a lug portion 51 of which is bent over against a side of the nut 47.

The bearings in the end plate 11 are enclosed by a cover plate 60 and the bearings in the end plate 12 as well as the ends of the shafts and connected gears are enclosed by a cover plate 61, both of which cover plates are suitably secured to the body 10 as by bolts 62.

The bearings may be lubricated by filling the spaces between the end covers and the end plates with a suitable liquid lubricant and maintaining the pressure of the liquids equal on both sides of the bearings. Alternatively, a small opening, for example, around 1/32 inch in diameter may be provided in each end plate leading into the connecting passage.

A counter shaft 65 is journaled in a sealed bearing 66 in the cover plate 61 and is suitably connected in driven relation, preferably by a tongue and slot, to the shaft of the blocking rotor 17. The counter shaft 65 is connected by a suitable drive, such as a worm wheel 67, a worm gear 68 and a shaft 69 to a counter 70 of any suitable commercial construction, which drive preferably is enclosed in a casing 71 secured to the cover plate 61. An adjuster 72 of suitable commerical construction preferably is provided which is mounted on the casing 71 and in turn mounts the counter 70. The casing 71 may be adjusted (i. e., indexed), at suitable increments, relatively to the meter housing, about the axis of the counter shaft. Also the counter may be indexed, relatively to the casing 71.

The counter 70 is adapted to count the revolutions of the blocking rotor and, consequently, the displacement rotors thereby indicate the amount of liquid passing through the meter. The counter 70, as is customary, is calibrated to indicate the amount of liquid passing through the meter directly in units of liquid measure as, for example, gallons, or weight, as for example, pounds.

When the meter is to be used for metering liquids, it is connected to the source of liquid by attaching an inlet pipe 75 and an outlet pipe 76 to the casing in communication with the inlet and outlet ports 15 and 16 respectively.

The flow of liquid through the meter causes the displacement rotors 30 and 40 to rotate and since each are connected by the gearing, above described, to the blocking rotor 17, the latter is rotated at the same angular velocity as the displacement rotors. Likewise, the angular relationship between the displacement rotors and the blocking rotor is maintained by the aforesaid gearing. Assuming the displacement rotors to be in the positions indicated in Fig. 8, the inlet rotor 30 closes off the inlet chamber 23 and the outlet rotor 40 closes off the outlet chamber 24 to the inlet and outlet ports 15 and 16, respectively. The liquid passing through the meter causes the inlet rotor 30 to sweep around the inlet chamber 23, then past the inlet end of the connecting passage 25 and finally into the recess 18 of the blocking rotor 17, which latter has been rotated in position to receive the rotor blade 32 in the recess 18. During the above described movement of the inlet rotor 30, the outlet rotor 40 moves from the position shown in Fig. 8 wherein it closes the outlet chamber 24, past the outlet port and into the recess 18 of the blocking rotor 17, the latter having been rotated into the appropriate position to receive the blade 42, and then across the discharge end of the connecting passage 25, and finally the outlet rotor 40 sweeps around the outlet chamber 24 and back to the starting position assumed in this description. Thus, a full cycle of the meter is accomplished in the course of one revolution of the several rotors.

It will be noted that in the execution of the above described cycle, the inlet rotor 30 first closes the inlet chamber 23 (Fig. 8) and then sweeps the inlet chamber to admit a quantity of liquid equal to the volume of the inlet chamber 23. At the same time, the outlet rotor 40 opens the outlet chamber 24 to the outlet port 16 and allows an equal quantity of liquid to be discharged from the meter. Next, the inlet rotor 30 passes the inlet end of the passage 25 to provide free communication from the inlet port 15 through the inlet chamber 23 and the passage to the discharge or outlet end of the passage 25 which is closed just as the inlet end is opened. Thereafter the discharge outlet rotor 40 sweeps its chamber 24 to displace from the discharge chamber and through the outlet 16 a quantity of liquid equal to the volume of the outlet chamber 24. Thus, upon each one-half revolution of the rotors a quantity of liquid is displaced through the meter equal to the capacity of one of the chambers and, thus, during one complete revolution of the rotors a quantity of liquid is displaced equal to twice the volume of one chamber or equal to the combined volumes of both chambers.

Figure 8:
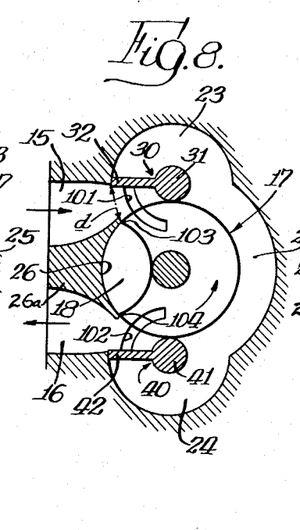

The present invention provides means for substantially eliminating or reducing internal vacuum and compression while at the same time maintaining a fully effective seal between the inlet and outlet ports. Internal vacuum tends to be created in the recess 18 during a portion of the movement of the inlet rotor blade 32 through the recess 18 and across the inlet port 15. Such vacuum begins when the blade 32 is moved into such position in the recess 18 that the sum of the area between the trailing edge of the recess 18 and the inlet rotor hub 31 (that is, the area equal to the distance $a$, indicated in Fig. 6, times the length of the rotors) plus the area between the free edge of the inlet rotor blade 32 and the corresponding edge of the surface 26 (that is, the area equal to the distance $b$, indicated in Fig. 6, times the length of the rotors) is less than the open area of the minimum cross-section of the inlet port (that is, the area equal to the distance $c$, indicated in Fig. 6, times the length of the rotors). The vacuum continues until the rotor blade 32 has moved out of the recess 18 and across the inlet port 15 and is in such position that the area between the free edge of the inlet rotor blade 32 and the corresponding edge of the wall 26 (that is, the area equal to the distance *d*, indicated in Fig. 8, times the length of the rotors) is equal to the open area of the minimum cross-section of the inlet port. In other words the vacuum continues until the inlet rotor blade enters the inlet chamber 23 (Fig. 8).

Internal compression tends to be created in the recess 18 during a portion of the movement of the outlet rotor blade 42 across the outlet port 16 and into the recess 18. Such compression begins when the outlet rotor blade 42 leaves the outlet chamber 24 and the area between the free end of the outlet rotor blade and the corresponding edge of the wall 26 is less than the open area of the minimum cross-section of the outlet port 16. The compression continues until the outlet rotor blade 42 is in the recess 18 and in a position wherein the sum of the area between the free end of the outlet rotor blade 42 and the corresponding edge of the wall 26 plus the area between the leading edge of the rotor recess 18 and the outlet rotor hub 41 is greater than the open area of the minimum cross section of the outlet port 16.

In order to minimize or substantially eliminate such vacuum and compression auxiliary ports 101 and 102 are formed in the end plates 11 and 12 to provide passageways respectively connecting the inlet port 15 and the blocking rotor recess 18 during movement of the inlet rotor blade 32 out of the recess 18 and across the inlet port, and connecting the outlet port 16 and the recess 18 during movement of the outlet rotor across the outlet port 16 and into the recess 18.

The auxiliary ports are of elongate, arcuate form in area and are complementally arranged, each being concentric with the axis of the corresponding displacement rotor and extending preferably through a sector of approximately 90 degrees so located that one end of each port is adjacent the outer opening of the corresponding displacement chamber and the other end is disposed adjacent the common center line of the displacement rotors. The auxiliary ports preferably are made as wide and deep as possible consistent with adequate strength of the end plates at the portions in which the auxiliary ports are formed.

Figure 1:
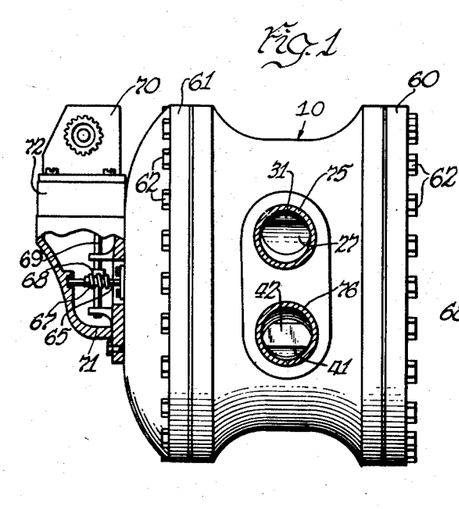
Figure 1 is a side elevational view of a meter embodying the invention, with a portion broken away and in section.
Figure 2:
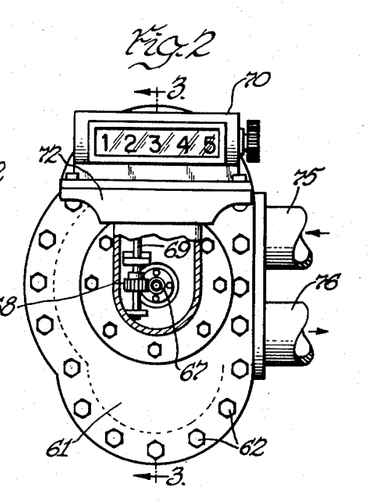
Fig. 2 is an end elevational view of the meter of Fig. 1, with a portion broken away and sectioned.
Figure 3:
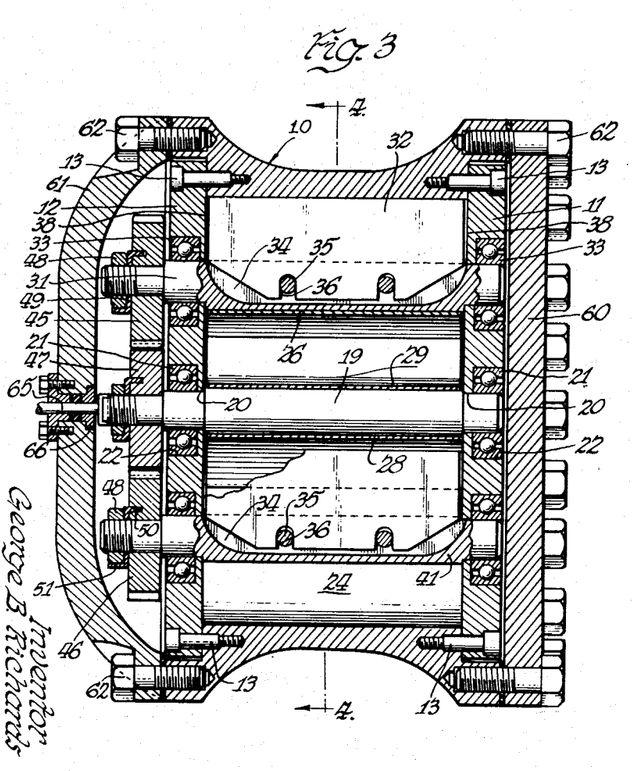
Fig. 3 is an enlarged, fragmentary cross-sectional view taken along the line 3—3 of Fig. 1.
Figure 4:
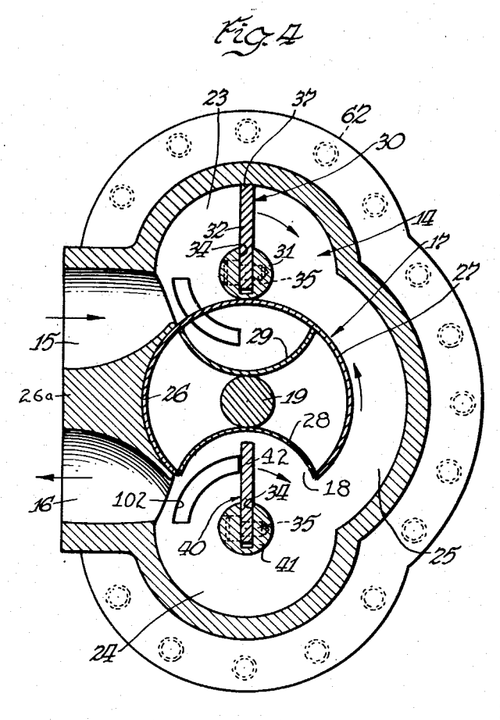
Fig. 4 is a sectional view taken along the line 4—4 of Fig. 3.
Figure 5:
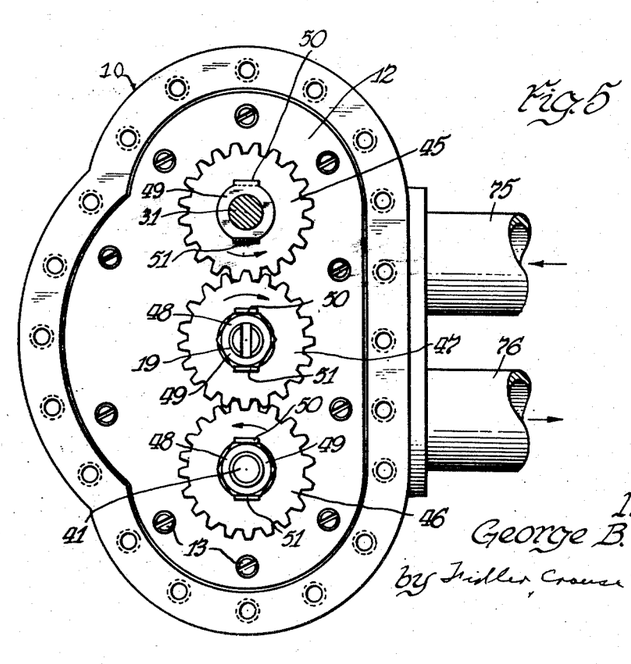
Fig. 5 is an end view of the meter with the corresponding end cover removed.
Figure 6:
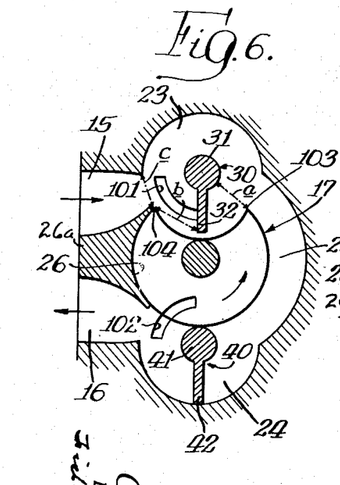
Figs. 6 to 9 inclusive are diagrammatic views showing respectively the rotors in several different positions which they assume during operation.
Figure 7:
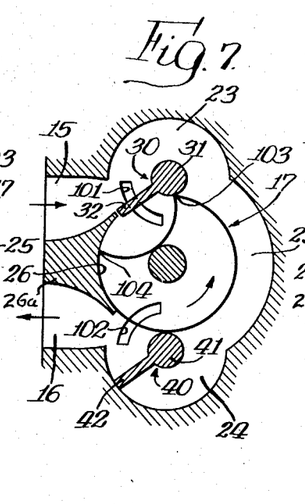

Let it be assumed that the rotors are in the positions illustrated diagrammatically in Fig. 6. In this position the inlet rotor blade 32 is located in the recess 18 of the blocking rotor 17, and the outlet rotor hub 41 is in sealing relation with the blocking rotor 17 and the blade 42 is in sealing relation with the wall of the outlet chamber 24. Upon rotation of the rotors through approximately 60 degrees (as seen in Fig. 7) a seal is formed between the hub 31 and the trailing edge 103 of the blocking rotor recess 18, and the displacement rotor blade 32 passes in close proximity to the edge of the arcuate wall portion 26. As rotation continues and the rotor blade 32 moves out of the recess and away from the edge of the arcuate wall portion 26 it would tend to draw a vacuum on the liquid in the recess 18 were it not for the auxiliary ports 101. The auxiliary ports 101 provide passageways for liquid between the inlet port 15 and the cavity 18, around the ends of the rotor blade 32, thus substantially preventing the establishment of any vacuum effect during this portion of the cycle.

Figure 9:
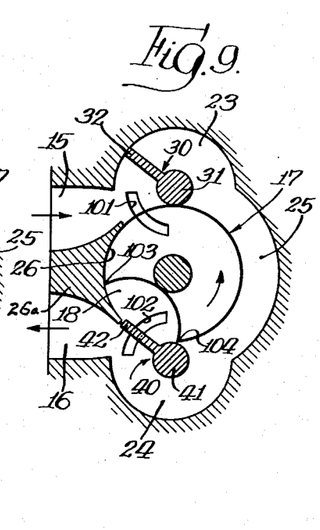

Upon continued rotation of the rotors they move to the position shown in Fig. 8 wherein the recess 18 is sealed by the arcuate wall portion 26. During this portion of the cycle a seal exists between the hub 41 and the blocking rotor 17. Upon further rotation of the rotors through approximately 60 degrees (as seen in Fig. 9) the outlet rotor blade 42 is brought into position in close proximity to the edge of the arcuate wall portion 26 and in position to enter the cavity 18. In this position of the rotors the cavity 18 is substantially sealed and as the rotor blade 42 enters the cavity 18 there would be a tendency to produce compression upon the liquid within the cavity were it not for the auxiliary port 102. This port functions to provide a passage between the cavity 18 and the outlet port 16 which equalizes the liquid pressures and substantially prevents any compression of the liquid in the cavity 18.

From the foregoing it will be seen that the provision of the auxiliary ports substantially eliminates pulsation which otherwise would occur owing to the tendency to draw a vacuum in the cavity 18 when the inlet rotor passes therefrom and the tendency to compression which would otherwise result when the inlet rotor passes into cavity 18.

It will be noted that in the device of the present invention there is only one arcuate wall, namely the wall portion 26 along which the rotor, and more especially the rotor cavity 18 passes. Thus it is necessary to provide only the two auxiliary ports illustrated in order to eliminate pulsation caused by vacuum or compression established in the blocking rotor cavity.

While the provision of auxiliary ports has been illustrated in connection with the particular novel rotary displacement device herein disclosed it is to be understood that this novel auxiliary porting arrangement may be employed with other forms of rotary liquid displacement devices embodying displacement and blocking rotors wherein the displacement rotors have blades adapted to enter cavities in the blocking rotors.

From the foregoing, it will be seen that the meter of the present invention operates to positively measure in an accurate manner the liquid displaced therethrough in a continuous, uninterrupted flow during each revolution of the meter or, in fact, during any portion of a revolution. The revolution of the blocking rotor 17 operates through the gears 47, 45 and 46, the counter shaft 65, the drive and the adjuster to drive the counter 70. The counter as aforesaid counts the number of revolutions and provides an indication thereof but preferably in terms of the volume or weight corresponding to the number of revolutions counted.

Since the meter is of the positive displacement type and since there is a minimum of inertia in the moving parts and a minimum of interference with the smooth flow of liquid through the meter, the pressure loss is very low and the meter accordingly is very accurate. Moreover, there is no metal to metal contact and no rubbing friction between the relatively movable displacement elements and the friction loss, therefore, is almost negligible. Because of the arrangement and shape of the movable members there is no end thrust.

It also should be noted that by reason of the construction of the meter, and particularly the novel auxiliary porting arrangement, there is no compression of nor vacuum drawn on the liquid as it flows through the meter.

The meter of the present invention requires very little servicing for several reasons. In the first place, it is very simple in construction and there are very few parts which require adjustment or, in fact, even can be adjusted. Moreover, there are no parts subject to rubbing friction and there is little, if any, wear. The meter can be very readily cleaned, where such is necessary, by removing the cover plates and the end plates to provide access to the interior. The bearings preferably are of standard construction and may be readily replaced should sufficient wear occur to render such replacement necessary.

The meter has a relatively large displacement per revolution relatively to the size of the meter and, therefore, the capacity for any given size meter is relatively high.

The construction of the meter is such that it is completely symmetrical and, therefore, completely reversible. Accordingly, the port hereinbefore described as the outlet port may be connected to the inlet pipe in the fluid system and the liquid caused to drive the meter in the opposite direction. The complemental auxiliary ports or passageways 101 and 102 provide equally effective relief from vacuum or compression phases of the cycle in reverse rotation or flow. Of course, where the meter is to be used with a conventional counter, it would be reversed then in order to obtain a positive reading. Of course, where the counter itself is also reversible, the meter could be used in a subtractive manner in which case the counter would deduct the amount of the reverse flow from any previous positive flow.

The meter also may be reversed in respect to its orientation relatively to the pipes to which it is connected. Where such is desirable, the meter is reversed by removing the cover plates 60 and 61, the end plates 11 and 12 and the parts carried thereby and reassembling all such members with the casing in reversed relation.

The arrangement of the rotors and the direction of rotation is such that should any debris be carried into the meter, it will be carried along in the direction of the flow of the liquid and will be discharged from the meter. There are no pockets, crevices or obstructions in which or against which debris would tend to lodge. In this connection, it will be noted that the direction of flow of the liquid in the meter is such that any debris which enters tends to be carried away from the seals between the blocking rotors and the two displacement rotors and is not carried into the seal.

This application is a continuation-in-part of my copending application, Serial No. 325,598, filed December 12, 1952 and now abandoned.

I claim:

1. A rotary, positive displacement device for liquids comprising a hollow casing having two diametrically opposite wall portions defining semi-cylindrical inlet and outlet chambers respectively, inlet and outlet ports communicating with said chambers respectively, a blocking wall portion between said ports, and a wall portion connecting said chamber wall portions, a blocking rotor rotatably mounted in said casing in sealing relation to said blocking wall portion and spaced from said connecting wall portion to define therewith a passage connecting said chambers, inlet and outlet displacement rotors rotatably mounted in said chambers respectively, each having a hub positioned to pass in sealing relation to the periphery of said blocking rotor and a blade extending radially therefrom having a free edge positioned to sweep in sealing relation to the wall of the corresponding chamber, said blocking rotor having a recess in its periphery of sufficient size to allow each blade to sweep therethrough in spaced relation to said blocking rotor and of an angular extent not greater than said blocking wall portion, and means connecting all of said rotors for simultaneous rotation in predetermined angular relation, whereby said displacement rotors are successively and singly in sealing relation with said casing and each displacement rotor is in sealing relation with said blocking rotor at least while it is in sealing relation with said casing, said casing having an auxiliary port positioned to connect the portion of said recess behind said inlet rotor blade and said inlet port during movement of said inlet rotor blade out of said recess and into said inlet chamber.

2. A rotary, positive displacement device for liquids comprising a hollow casing having two diametrically opposite wall portions defining semi-cylindrical inlet and outlet chambers respectively, inlet and outlet ports communicating with said chambers respectively, a blocking wall portion between said ports and a wall portion connecting said chamber wall portions, a blocking rotor rotatably mounted in said casing in sealing relation to said blocking wall portion and spaced from said connecting wall portion to define therewith a passage connecting said chambers, inlet and outlet displacement rotors rotatably mounted in said chambers respectively, each having a hub positioned to pass in sealing relation to the periphery of said blocking rotor and a blade extending radially therefrom having a free edge positioned to sweep in sealing relation to the wall of the corresponding chamber, said blocking rotor having a recess in its periphery of sufficient size to allow each blade to sweep therethrough in spaced relation to said blocking rotor and of an angular extent not greater than said blocking wall portion, and means connecting all of said rotors for simultaneous rotation in predetermined angular relation, whereby said displacement rotors are successively and singly in sealing relation with said casing and each displacement rotor is in sealing relation with said blocking rotor at least while it is in sealing relation with said casing, said casing having an auxiliary port positioned to connect the portion of said recess ahead of said rotor blade and said outlet port during movement of said outlet rotor blade out of said outlet chamber and into said recess.

3. A rotary positive displacement device for liquids comprising a hollow casing having two diametrically opposite wall portions defining semi-cylindrical inlet and outlet chambers respectively, inlet and outlet ports communicating with said chambers respectively, a blocking wall portion between said ports and a wall portion connecting said chamber wall portions, a blocking rotor rotatably mounted in said casing in sealing relation to said blocking wall portion and spaced from said connecting wall portion to define therewith a passage connecting said chambers, inlet and outlet displacement rotors rotatably mounted in said chambers respectively, each having a hub positioned to pass in sealing relation to the periphery of said blocking rotor and a blade extending radially therefrom having a free edge positioned to sweep in sealing relation to the wall of the corresponding chamber, said blocking rotor having a recess in its periphery of sufficient size to allow each blade to sweep therethrough in spaced relation to said blocking rotor and of an angular extent not greater than said blocking wall portion, and means connecting all of said rotors for simultaneous rotation in predetermined angular relation, whereby said displacement rotors are successively and singly in sealing relation with said casing and each displacement rotor is in sealing relation with said blocking rotor at least while it is in sealing relation with said casing, said casing having auxiliary ports positioned respectively to connect the portion of said recess behind said inlet rotor blade and said inlet port during movement of said inlet rotor out of said recess and into said inlet chamber and to connect the portion of said recess ahead of said outlet rotor blade and said outlet chamber during movement of said outlet blade out of said outlet chamber and into said recess.

4. A rotary, positive displacement device for liquids comprising a hollow casing having two diametrically opposite wall portions defining semi-cylindrical inlet and outlet chambers respectively, inlet and outlet ports communicating with said chambers respectively, a blocking wall portion between said ports and a wall portion connecting said chamber wall portions, a blocking rotor rotatably mounted in said casing in sealing relation to said blocking wall portion and spaced from said connecting wall portion to define therewith a passage connecting said chambers, inlet and outlet displacement rotors rotatably mounted in said chambers respectively, each having a hub positioned to pass in sealing relation to the periphery of said blocking rotor and a blade extending radially therefrom having a free edge positioned to pass in sealing relation to the wall of the corresponding chamber, said blocking rotor having a recess in its periphery of sufficient size to allow each blade to sweep therethrough in spaced relation to said blocking rotor and of an angular extent not greater than said blocking wall portion, and means connecting all of said rotors for simultaneous rotation in predetermined angular relation, whereby said displacement rotors are successively and singly in sealing relation with said casing and each displacement rotor is in sealing relation with said blocking rotor at least while it is in sealing relation with said casing, said casing having an auxiliary port positioned to connect said recess and said inlet port during the portion of the movement of said inlet rotor blade out of said recess and across said inlet port from the position in which the distance from the trailing edge of said recess to the inlet rotor hub plus the distance from the outer edge of the inlet rotor blade to the corresponding edge of the blocking wall portion is less than the minimum width of the inlet port up to a position in which the distance between the outer edge of the rotor blade and the corresponding edge of the blocking wall portion is equal to the minimum width of the inlet port.

5. A rotary, positive displacement device for liquids comprising a hollow casing having two diametrically opposite wall portions defining semi-cylindrical inlet and outlet chambers respectively, inlet and outlet ports communicating with said chambers respectively, a blocking wall portion between said ports and a wall portion connecting said chamber wall portions, a blocking rotor rotatably mounted in said casing in sealing relation to said blocking wall portion and spaced from said connecting wall portion to define therewith a passage connecting said chambers, inlet and outlet displacement rotors rotatably mounted in said chambers respectively, each having a hub positioned to pass in sealing relation to the periphery of said blocking rotor and a blade extending radially therefrom having a free edge positioned to pass in close proximity to the wall of the corresponding chamber, said blocking rotor having a recess in its periphery of sufficient size to allow each blade to sweep therethrough in spaced relation to said blocking rotor and of an angular extent not greater than said blocking wall portion, and means connecting all of said rotors for simultaneous rotation at fixed, predetermined angular relation, whereby said displacement rotors are successively and singly in sealing relation with said casing and each displacement rotor is in sealing relation with said blocking rotor at least while it is in sealing relation with said casing, said casing having an auxiliary port positioned to connect said recess and said outlet port during the portion of the movement of said outlet rotor across said outlet port and into said recess from the position wherein the distance between the outer edge of the outlet rotor blade and the corresponding edge of the blocking wall is less than the minimum width of the outlet port up to a position wherein the distance from the outer edge of the outlet rotor to the corresponding edge of the blocking wall portion plus the distance from the leading edge of the recess to the outlet rotor hub is equal to the minimum width of the outlet port.

6. A rotary, positive displacement device for liquids comprising a hollow casing having a pair of end walls, two diametrically opposite side wall portions defining semi-cylindrical inlet and outlet chambers respectively, inlet and outlet ports communicating with said chambers respectively, a blocking wall portion between said ports and a wall portion connecting said chamber wall portions, a blocking rotor rotatably mounted in said casing in sealing relation to said blocking wall portion and spaced from said connecting wall portion to define therewith a passage connecting said chambers, displacement rotors rotatably journaled in said end walls and disposed in said chambers respectively on a common center line with said blocking rotor, each of said displacement rotors having a hub positioned to pass in sealing relation to the periphery of said blocking rotor and a blade extending radially therefrom having a free edge positioned to sweep in sealing relation to the wall of the corresponding chamber, said blocking rotor having a recess in its periphery of sufficient size to allow each blade to sweep therethrough in spaced relation to said blocking rotor and of an angular extent not greater than said blocking wall portion, and means connecting all of said rotors for simultaneous rotation in predetermined angular relation, whereby said displacement rotors are successively and singly in sealing relation with said casing and each displacement rotor is in sealing relation with said blocking rotor at least while it is in sealing relation with said casing, at least one of said end walls having a port therein extending from a point substantially at the entrance to one of said chambers to a point within the envelope of said blocking rotor periphery and substantially on the common center line through said rotors.

7. A single stage rotary, positive displacement device for liquids comprising a hollow casing having two diametrically opposite wall portions defining semi-cylindrical inlet and outlet chambers respectively, inlet and outlet ports communicating with said chambers respectively, a blocking wall portion between said ports and a wall portion connecting said chamber wall portions, a blocking rotor rotatably mounted in said casing in sealing relation to said blocking wall portion and spaced from said connecting wall portion to define therewith an unobstructed passage connecting said chambers and equal in width to the distance between the periphery of the blocking rotor and said connecting wall portion, displacement rotors rotatably mounted in said chambers respectively, each having a hub positioned to pass in sealing relation to the periphery of said blocking rotor and a single blade extending radially therefrom having a free edge positioned to pass in sealing relation to said wall of the corresponding chamber, said blocking rotor having a single recess in its periphery of sufficient size to allow each blade to sweep therethrough in spaced relation to said displacement rotor and of an angular extent not greater than said blocking wall portion, and means connecting said rotors for simultaneous rotation in predetermined angular relation, whereby said displacement rotors are successively and singly in sealing relation with said casing and each displacement rotor is in sealing relation with said blocking rotor at least while it is in sealing relation with said casing.

8. A rotary, positive displacement device for liquids comprising a hollow casing having two diametrically opposite wall portions defining semi-cylindrical inlet and outlet chambers respectively, inlet and outlet ports communicating with said chambers respectively, a blocking wall portion between said ports and a wall portion connecting said chamber wall portions, a blocking rotor rotatably mounted in said casing in sealing relation to said blocking wall portion and spaced from said connecting wall portion, to define therewith a passage connecting said chambers, displacement rotors rotatably mounted in said chambers respectively, each having a hub positioned to pass in sealing relation to said blocking rotor and a blade extending radially therefrom having a free edge positioned to pass in sealing relation to the wall of the corresponding chamber through an angle of not more than 180°, said blocking rotor having a recess in its periphery of sufficient size to allow each blade to sweep therethrough in spaced relation to said blocking rotor and of an angular extent not greater than said blocking wall portion, and means connecting said rotors for simultaneous rotation in predetermined angular relation, whereby said displacement rotors are successively and singly in sealing relation with said casing and each displacement rotor is in sealing relation with said blocking rotor at least while it is in sealing relation with said casing.

9. A rotary, positive displacement device for liquids comprising a hollow casing having two diametrically opposite wall portions defining semi-cylindrical inlet and outlet chambers respectively, inlet and outlet ports communicating with said chambers respectively, a blocking wall portion between said ports and a wall portion connecting said chamber wall portions, a blocking rotor rotatably mounted in said casing in sealing relation to said blocking wall portion and spaced from said connecting wall portion to define therewith a passage connecting said chambers, displacement rotors rotatably mounted in said chambers respectively, each having a hub positioned to pass in sealing relation to the periphery of said blocking rotor and a single blade extending radially therefrom having a free edge positioned to pass in sealing relation to the wall of the corresponding chamber through an angle of not more than 180°, said blocking rotor having a recess in its periphery of sufficient size to allow each blade to sweep therethrough, in spaced relation to said blocking rotor and of an angular extent not greater than said blocking wall portion, and means connecting said rotors for simultaneous rotation at the same angular velocity and in such predetermined angular relation that each blade enters its chamber in sealing relation with the wall thereof as the other blade leaves its chamber and moves out of sealing relation with the wall thereof and each displacement rotor is in sealing relation with said blocking rotor at least while it is in sealing relation with said casing.

10. A rotary, positive displacement device for liquids comprising a hollow casing having two diametrically opposite wall portions defining semi-cylindrical inlet and outlet chambers respectively, inlet and outlet ports communicating with said chambers respectively, a blocking wall portion between said ports and a wall portion connecting said chamber wall portions, a blocking rotor rotatably mounted in said casing in sealing relation to said blocking wall portion and spaced from said connecting wall portion to define therewith a passage connecting said chambers, displacement rotors rotatably mounted in said chambers respectively, each having a hub positioned to pass in sealing relation to said blocking rotor and a blade extending radially therefrom having a free edge positioned to pass in sealing relation to the wall of the corresponding chamber, said blocking rotor having a recess in its periphery of sufficient size to allow each blade to sweep therethrough in spaced relation to said blocking rotor and of an angular extent not greater than said blocking wall portion, and means connecting said rotors for simultaneous rotation in predetermined angular relation, whereby said displacement rotors are successively and singly in sealing relation with said casing and each displacement rotor is in sealing relation with said blocking rotor at least while it is in sealing relation with said casing, the peripheral surfaces of said blocking rotor and of said hubs and the free edge surfaces of said blades being spaced from the opposing surfaces of the casing and provided with fine serrations for creating turbulence in the liquid between said serrated surfaces and opposing surfaces to provide labyrinthine capillary seals between said surfaces.

11. A rotary positive displacement device for liquids comprising a hollow casing having end walls and a side wall formed with a pair of spaced, semi-cylindrical wall portions providing inlet and outlet cavities, respectively, inlet and outlet ports communicating with said cavities respectively, a blocking wall portion between said ports and a wall portion connecting said semi-cylindrical wall portions a pair of displacement rotors, each rotatably mounted in said casing in position to pass through one of said cavities respectively in sealing relation with the semi-cylindrical wall portion for approximately 180° of its rotation, a blocking rotor rotatably mounted in said casing and having a peripheral portion positioned to pass successively in sealing relation with said displacement rotors and with said blocking wall portion and in spaced relation to said connecting wall portion, said blocking rotor having a recess therein of an angular extent not greater than said blocking wall portion and positioned to receive said displacement rotors successively therethrough in spaced relation to said blocking rotor, and means connecting all of said rotors for simultaneous rotation in predetermined angular relation whereby said displacement rotors are successively and singly in sealing relation with said casing and each displacement rotor is in sealing relation with said blocking rotor at least while it is in sealing relation with said casing, at least one of said end walls having a passage positioned to connect said inlet port and that portion of said recess behind said inlet rotor during movement of the corresponding rotor out of said recess and into said inlet cavity.

12. A rotary positive displacement device for liquids comprising a hollow casing having end walls and a side wall formed with a pair of spaced, semi-cylindrical wall portions providing inlet and outlet cavities, respectively, inlet and outlet ports communicating with said cavities respectively, a blocking wall portion between said ports and a wall portion connecting said semi-cylindrical wall portions a pair of displacement rotors, each rotatably mounted in said casing in position to pass through one of said cavities respectively in sealing relation with the semi-cylindrical wall portion for approximately 180° of its rotation, a blocking rotor rotatably mounted in said casing and having a peripheral portion positioned to pass successively in sealing relation with said displacement rotors and with said blocking wall portion and in spaced relation to said connecting wall portion, said blocking rotor having a recess therein of an angular extent not greater than said blocking wall portion and positioned to receive said displacement rotors successively therethrough in spaced relation to said blocking rotor, and means connecting all of said rotors for simultaneous rotation in predetermined angular relation whereby said displacement rotors are successively and singly in sealing relation with said casing and each displacement rotor is in sealing relation with said blocking rotor at least while it is in sealing relation with said casing, at least one of said end walls having a passage positioned to connect said outlet port and that portion of said recess ahead of said rotor during movement of the corresponding rotor out of said outlet cavity and into said recess.

13. A rotary positive displacement device for liquids comprising a hollow casing having end walls and a side wall formed with a pair of spaced, semi-cylindrical wall portions providing inlet and outlet cavities, respectively, inlet and outlet ports communicating with said cavities respectively, a blocking wall portion between said ports and a wall portion connecting said semi-cylindrical wall portions a pair of displacement rotors, each rotatably mounted in said casing in position to pass through one of said cavities respectively in sealing relation with the semi-cylindrical wall portion for approximately 180° of its rotation, a blocking rotor rotatably mounted in said casing and having a peripheral portion positioned to pass successively in sealing relation with said displacement rotors and with said blocking wall portion and in spaced relation to said connecting wall portion, said blocking rotor having a recess therein of an angular extent not greater than said blocking wall portion and positioned to receive said displacement rotors successively therethrough in spaced relation to said blocking rotor, and means connecting all of said rotors for simultaneous rotation in predetermined angular relation whereby said displacement rotors are successively and singly in sealing relation with said casing and each displacement rotor is in sealing relation with said blocking rotor at least while it is in sealing relation with said casing, at least one of said end walls having a passage positioned to connect one of said ports and said recess during at least that portion of the movement of the corresponding rotor that the area of the space providing communication between said recess and the portion of said casing interior externally of said recess is less than the area of said one port.

14. A rotary positive displacement device for liquids comprising a hollow casing having end walls and a side wall formed with a pair of spaced, semi-cylindrical wall portions providing inlet and outlet cavities, respectively, inlet and outlet ports communicating with said cavities respectively, a blocking wall portion between said ports and a wall portion connecting said semi-cylindrical wall portions a pair of displacement rotors, each rotatably mounted in said casing in position to pass through one of said cavities respectively in sealing relation with the semi-cylindrical wall portion for approximately 180° of its rotation, each of said displacement rotors including a hub and a portion projecting from said hub, a blocking rotor rotatably mounted in said casing and having a peripheral portion positioned to pass successively in sealing relation with said displacement rotors and with said blocking wall portion, and in spaced relation to said connecting wall portion, said blocking rotor having a recess therein of an angular extent not greater than said blocking wall portion and positioned to receive said displacement rotors successively therethrough in spaced relation to said blocking rotor, and means connecting all of said rotors for simultaneous rotation in predetermined angular relation whereby said displacement rotors are successively and singly in sealing relation with said casing and each displacement rotor is in sealing relation with said blocking rotor at least while it is in sealing relation with said casing, at least one of said end walls having a passage positioned to connect said inlet port and said recess during at least that portion of the movement of the inlet rotor out of said recess and across the inlet port from the position in which the distance from the trailing edge of said recess to the inlet rotor hub plus the distance from the outer edge of the inlet rotor projection to the corresponding edge of the recess is less than the minimum width of the inlet port up to the position in which the distance between the outer edge of the inlet rotor projection and the corresponding edge of the blocking wall portion is equal to the minimum width of the inlet port.

15. A rotary positive displacement device for liquids comprising a hollow casing having end walls and a side wall formed with a pair of spaced, semi-cylindrical wall portions providing inlet and outlet cavities, respectively, inlet and outlet ports communicating with said cavities respectively, a blocking wall portion between said ports and a wall portion connecting said semi-cylindrical wall portions a pair of displacement rotors, each rotatably mounted in said casing in position to pass through one of said cavities respectively in sealing relation with the semi-cylindrical wall portion for approximately 180° of its rotation, each of said displacement rotors including a hub and a portion projecting from said hub, a blocking rotor rotatably mounted in said casing and having a peripheral portion positioned to pass successively in sealing relation with said displacement rotors and with said blocking wall portion and in spaced relation to said connecting wall portion, said blocking rotor having a recess therein of an angular extent not greater than said blocking wall portion and positioned to receive said displacement rotors successively therethrough in spaced relation to said blocking rotor, and means connecting all of said rotors for simultaneous rotation in predetermined angular relation whereby said displacement rotors are successively and singly in sealing relation with said casing and each displacement rotor is in sealing relation with said blocking rotor at least while it is in sealing relation with said casing, at least one of said end walls having a passage positioned to connect said outlet port and said recess during at least that portion of the movement of the outlet rotor across said outlet port and into said recess from the position wherein the distance between the outer edge of the outlet rotor projection and the corresponding edge of the blocking wall portion is less than the minimum width of the outlet port up to a position wherein the distance from the outer edge of the outlet rotor projection to the corresponding edge of the blocking wall plus the distance from the leading edge of the recess to the outlet rotor hub is equal to the minimum width of the outlet port.

16. A displacement rotor for a positive displacement device for liquids, said rotor comprising a cylindrical hub having a groove therein disposed symmetrically with a diametral plane through said hub and opening at one side of the hub, a generally planar rotor blade having two generally parallel faces, a marginal portion of said hub being disposed in said groove and the remainder projecting from said groove in a direction radially outward from said hub, said blade having a plurality of slots formed in said marginal portion thereof and extending through said blade from face to face thereof, and a plurality of screws threaded into said hub in a direction perpendicularly to the faces of said blade and extending through said blade to clamp the latter in said hub.

17. A rotary positive displacement device for liquids comprising a hollow casing having inlet and outlet ports and a plurality of rotor-sealing wall portions intermediate said inlet and outlet ports, a plurality of displacement rotors rotatably mounted in said casing in position to pass in sealing relation to an equal number of said rotor-sealing wall portions respectively, each said displacement rotor being disposed to pass in sealing relation to its sealing wall portion for an angle equal to 360° divided by the number of displacement rotors, a blocking rotor rotatably mounted in said casing and having a convex peripheral sealing portion positioned to pass in sealing relation with another of said sealing wall portions and successively with said displacement rotors, such sealing portion being of such angular extent that it is in sealing relation with each of said displacement rotors while such rotor is in sealing relation with said casing, and a recess of a sufficient size and positioned to pass in spaced relation to said displacement rotors successively and of an angular extent not greater than said blocking wall portion, and means interconnecting all of said rotors for simultaneous rotation in a fixed phase relation whereby said displacement rotors are successively and singly in sealing relation with said casing and each displacement rotor is in sealing relation with said blocking rotor at least while it is in sealing relation with said casing.

References Cited in the file of this patent

UNITED STATES PATENTS

| | | |
|---|---|---|
| 188,108 | Disston | Mar. 6, 1877 |
| 578,938 | Marburg, Jr. | Mar. 16, 1897 |
| 791,147 | Green | May 30, 1905 |
| 935,079 | Wheeler | Sept. 28, 1909 |
| 1,078,870 | Nyquist | Nov. 18, 1913 |
| 1,368,869 | Whiting | Feb. 15, 1921 |
| 1,652,323 | Pettersson | Dec. 13, 1927 |
| 2,483,705 | Levetus et al. | Oct. 4, 1949 |
| 2,497,373 | Richards, Jr. | Feb. 14, 1950 |
| 2,531,603 | Berck | Nov. 28, 1950 |
| 2,614,503 | Berry | Oct. 21, 1952 |

FOREIGN PATENTS

| | | |
|---|---|---|
| 27,868 | Switzerland | Sept. 25, 1902 |
| 148,398 | Great Britain | Mar. 31, 1921 |
| 286,662 | Germany | Aug. 26, 1915 |
| 432,450 | France | Oct. 5, 1911 |